C. GUNTRUM.
AIR FILTER.
APPLICATION FILED JAN. 20, 1910.
972,183.
Patented Oct. 11, 1910.
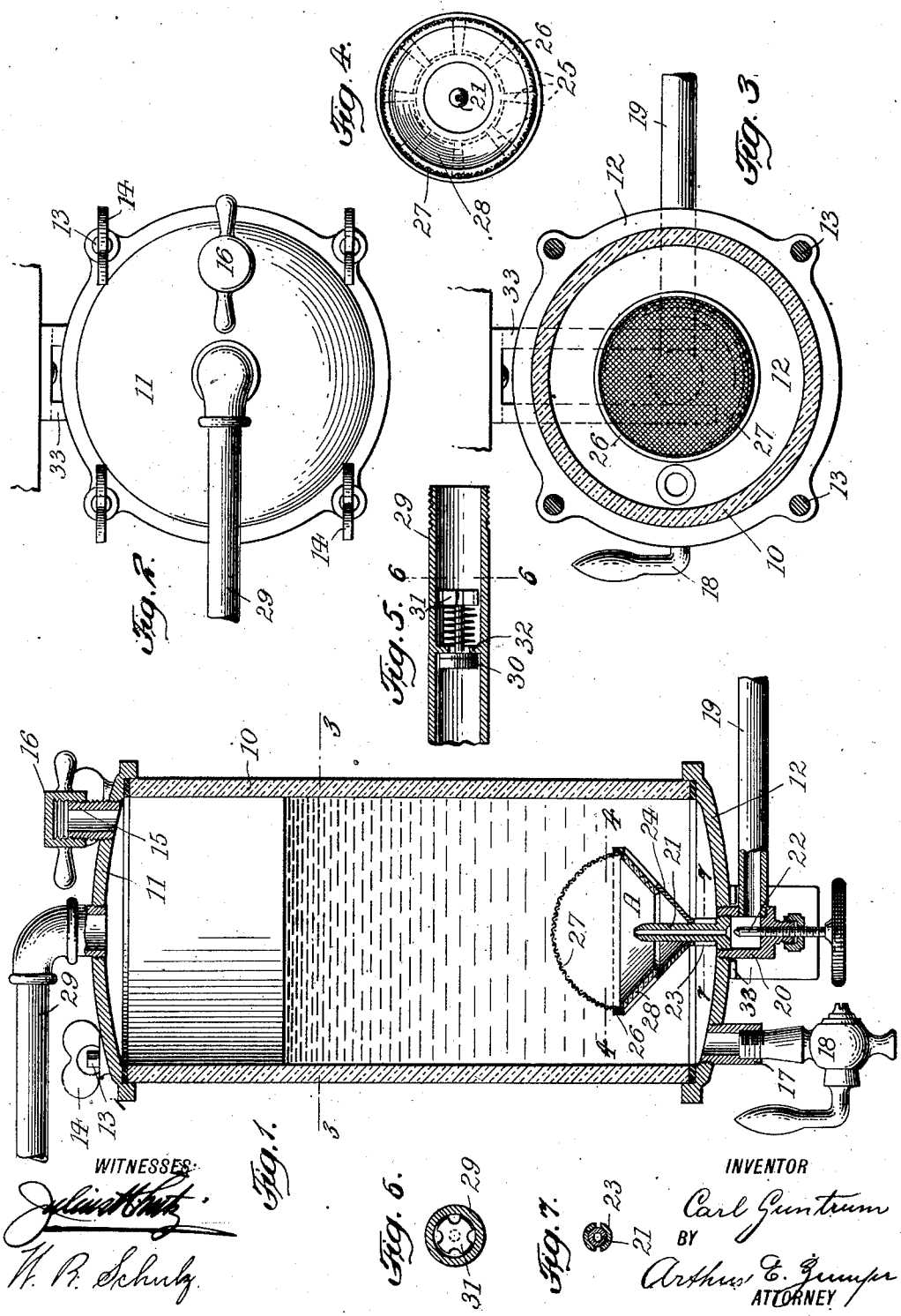

UNITED STATES PATENT OFFICE.

CARL GUNTRUM, OF NEW YORK, N. Y.

AIR-FILTER.

972,183.        Specification of Letters Patent.        Patented Oct. 11, 1910.

Application filed January 20, 1910. Serial No. 539,083.

*To all whom it may concern:*

Be it known that I, CARL GUNTRUM, a citizen of the United States, residing at New York city, Brooklyn, county of Kings, State of New York, have invented new and useful Improvements in Air-Filters, of which the following is a specification.

This invention relates to an air filter of novel construction, in which finely comminuted air bubbles are caused to rise through a suitable filtering liquid, so that the air becomes thoroughly purified. The entire filtering operation is carried on in full view of the operator, who may thus readily control the volume and speed of the air admitted, and consequently the duration of time during which the air is subjected to the purifying process.

In the accompanying drawing: Figure 1 is a vertical section of my improved air filter; Fig. 2 a plan; Fig. 3 a horizontal section on line 3—3, Fig. 1; Fig. 4 a similar section on line 4—4, Fig. 1; Fig. 5 a detail of the check-valve; Fig. 6 a cross section on line 6—6, Fig. 5, and Fig. 7 a cross section on line 7—7, Fig. 1.

A cylindrical glass receptacle 10 is provided with a head 11 and a bottom 12 which are removably connected to each other by bolts 13 carrying winged nuts 14. A suitable purifying or filtering solution is adapted to be introduced into vessel 10 through a threaded nozzle 15 of head 11, which may be closed by a cap 16, while the impure liquid may be withdrawn through an outlet pipe 17 of bottom 12 which is controlled by a stop cock 18. A very effective filtering solution is formed by a mixture of antiformin and permanganate of potash, the latter indicating by a change in color when the liquid has become saturated with organic substances. However, a differently constituted filtering solution may obviously be used.

The air to be filtered passes under pressure through a pipe 19 which enters a socket 20 depending from the center of bottom 12. From socket 20 the air flows through a central aperture of bottom 12 into a nozzle 21 that projects into vessel 10 from bottom 12. The volume of air thus admitted into nozzle 21 may be controlled by a needle-valve 22 tapped into socket 20. Nozzle 21 is embraced by the split hub 23, (Fig. 7), of a coniform shell 24 provided at its upper end with a series of diverging arms 25 carrying a gallery 26. Upon this gallery is firmly seated a semi-globular finely meshed wire screen 27 adapted for the passage of comminuted air bubbles from shell 24 into the body of vessel 10. The openings between arms 25 and below screen 27 are closed by a window 28 that permits a free inspection of the rising air, while preventing the escape of such air other than through screen 27.

It will be seen that shell 24 together with window 28 and screen 27, constitute in effect a cup or pocket A, which is submerged within the liquid contained in vessel 10, so that the air will rise within said pocket in the form of comparatively large bubbles. As these bubbles are clearly visible, their size, together with the rapidity of their ascent, may be readily controlled by manipulating needle valve 22. The outer diameter of cup A is considerably smaller than the inner diameter of vessel 10, so that an annular clearance is formed between cup and vessel through which impurities may freely settle upon bottom 12 without obstructing the window or clogging the screen.

The outlet pipe 29 for the purified air communicates with a corresponding opening of head 11. In case the filter is intended to convey the purified air to a beer pump or similar apparatus, working under pressure, it is necessary to provide pipe 29 with a spring-influenced check-valve 30. This valve permits the free egress of the filtered air, but prevents the ingress of the beer or other liquid into vessel 10. With the construction shown, valve 30 is provided with a scalloped guide 31 (Fig. 6), around which the air will flow to pass through the valve seat 32 and thus exert the desired pressure against the head of the valve.

In practice, vessel 10 is charged with the purifying liquid and the air to be filtered is admitted under pressure through pipe 19 and nozzle 21 into pocket A. From this pocket the air passes through screen 27 into the purifying liquid, in the form of minute dust-like bubbles, so that it becomes thoroughly filtered as it rises through such liquid. The air thus purified will collect within the top of vessel 10, above the liquid level, and is discharged through pipe 29. Whenever necessary, the sediment settling on bottom 12 may be removed through tap 17, together with the saturated purifying liquid. So also, shell 24 carrying strainer 27 may be readily slipped off nozzle 21 whenever the strainer is to be cleaned.

The filter is shown to be supported by a forked bracket 33 which straddles socket 20, but it is obvious that the filter may be suspended, or that it may be supported in a different manner.

I claim:

1. An air filter comprising a liquid vessel, an air nozzle projecting upwardly from the bottom thereof, a flaring shell having a hub that removably engages the nozzle, and a screen carried by the upper end of the shell.

2. An air filter, comprising a vessel, an air nozzle projecting into the same, an open coniform shell surrounding the nozzle, a window fitted into the shell, and a bulged screen carried by the shell.

3. An air filter, comprising a vessel, an air nozzle projecting into the same, a windowed shell having a hub that engages the nozzle, and a bulged screen carried by the shell.

4. An air filter, comprising a vessel, an air nozzle projecting into the same, a windowed shell surrounding the nozzle, a screen carried by the shell, and a valve controlling the nozzle.

5. An air filter, comprising a transparent vessel, an inclosed transparent and screened pocket, means for admitting air to said pocket, and means for controlling the volume of air thus admitted.

6. An air filter, comprising a transparent vessel, an inclosed transparent and screened pocket, an air nozzle within said pocket, and a valve controlling said nozzle.

7. An air filter, comprising a transparent vessel having a liquid inlet and a liquid outlet, a valve-controlled nozzle within the vessel, a windowed shell surrounding the nozzle, a bulged screen carried by the shell, and an upper valve-controlled air outlet.

Signed by me at New York city, (Manhattan,) N. Y., this 19th day of January, 1910.

CARL GUNTRUM.

Witnesses:
 FRANK V. BRIESEN,
 W. R. SCHULZ.